(12) United States Patent
Rasheed et al.

(10) Patent No.: US 9,807,610 B2
(45) Date of Patent: Oct. 31, 2017

(54) METHOD AND APPARATUS FOR SEAMLESS OUT-OF-BAND AUTHENTICATION

(71) Applicant: Intel Corporation, Santa Clara, CA (US)

(72) Inventors: Yasser Rasheed, Beaverton, OR (US); Abhilasha Bhargav-Spantzel, Santa Clara, CA (US); Hormuzd M. Khosravi, Portland, OR (US); Michael Raziel, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 25 days.

(21) Appl. No.: 14/669,268

(22) Filed: Mar. 26, 2015

(65) Prior Publication Data

US 2016/0286393 A1 Sep. 29, 2016

(51) Int. Cl.
*H04W 12/06* (2009.01)
*H04W 12/08* (2009.01)
*H04L 29/06* (2006.01)
*H04L 9/32* (2006.01)
(Continued)

(52) U.S. Cl.
CPC ............ *H04W 12/06* (2013.01); *G06F 21/35* (2013.01); *G06F 21/43* (2013.01); *H04L 9/3215* (2013.01); *H04L 9/3234* (2013.01); *H04L 63/0853* (2013.01); *H04L 63/18* (2013.01); *H04W 12/08* (2013.01); *H04L 2209/80* (2013.01)

(58) Field of Classification Search
CPC ....... H04W 12/06; H04W 12/08; G06F 21/35; G06F 21/43; H04L 9/3234; H04L 63/0853; H04L 63/18; H04L 9/3215; H04L 2209/80; G06Q 20/4012; G06Q 20/4014
See application file for complete search history.

(56) References Cited

U.S. PATENT DOCUMENTS 8,090,767 B2 * 1/2012 Adler ................ G06F 17/30067
455/418
2006/0066184 A1 * 3/2006 Sawada ................ B06B 1/0633
310/369
(Continued)

OTHER PUBLICATIONS

Ford-Long Wong, Frank Stajano and Jolyon Clulow "Repairing the Bluetooth pairing protocol", in Security Protocols, LNCS, 2005, B. Christianson et al. (Eds.), Springer-Verlag, Berlin, 17 pages.*
(Continued)

*Primary Examiner* — Catherine Thiaw
(74) *Attorney, Agent, or Firm* — Trop, Pruner & Hu, P.C.

(57) ABSTRACT

In an embodiment, at least one non-transitory computer readable storage medium includes instructions that when executed enable a system to: request, by an authentication logic of the system during a multi-factor authentication of a user of the system to obtain access to a first service, a token to be sent from a second system associated with the first service to a third system associated with the user; receive, in the authentication logic, the token from the third system without user involvement via a secure channel; and send the token from the authentication logic to the second system to authenticate the user. Other embodiments are described and claimed.

9 Claims, 11 Drawing Sheets

(51) Int. Cl.
*G06F 21/35* (2013.01)
*G06F 21/43* (2013.01)

(56) References Cited

U.S. PATENT DOCUMENTS

| | | | | |
|---|---|---|---|---|
| 2006/0068760 | A1* | 3/2006 | Hameed | H04L 63/061 455/412.1 |
| 2009/0187962 | A1* | 7/2009 | Brenneman | G06F 21/316 726/1 |
| 2010/0250955 | A1* | 9/2010 | Trevithick | G06F 21/31 713/185 |
| 2013/0198516 | A1* | 8/2013 | Fenton | H04L 63/0869 713/168 |
| 2013/0212650 | A1* | 8/2013 | Dabbiere | H04L 63/10 726/4 |
| 2013/0347089 | A1* | 12/2013 | Bailey | H04L 9/3215 726/7 |
| 2014/0013444 | A1* | 1/2014 | Gilchrist | G06F 21/10 726/28 |
| 2014/0032933 | A1* | 1/2014 | Smith | G06F 21/6209 713/193 |
| 2014/0096177 | A1* | 4/2014 | Smith | H04L 63/08 726/1 |
| 2014/0137178 | A1* | 5/2014 | Thom | G06F 21/6218 726/1 |
| 2014/0173686 | A1* | 6/2014 | Kgil | H04L 63/205 726/1 |
| 2014/0364151 | A1* | 12/2014 | Schiff | H04L 63/0838 455/456.3 |
| 2015/0088760 | A1* | 3/2015 | Meurs | G06Q 20/425 705/72 |
| 2015/0195394 | A1* | 7/2015 | Bietz | H04M 1/7253 455/419 |
| 2015/0365525 | A1* | 12/2015 | Liu | H04W 4/16 455/414.1 |
| 2016/0127900 | A1* | 5/2016 | John Archibald | H04W 12/06 726/7 |

OTHER PUBLICATIONS wikipedia.org, "IEEE 802.11i-2004," downloaded Aug. 6, 2014, 5 pages.
Frank McKeen, et al., "Innovative Instructions and Software Model for Isolated Execution," 2013, 8 pages.
Matthew Hoekstra, et al., "Using Innovative Instructions to Create Trustworthy Software Solutions," 2013, 8 pages.
Ittai Anati, et al., "Innovative Technology for CPU Based Attestation and Sealing," 2013, 7 pages.
U.S. Appl. No. 14/482,645, filed Aug. 29, 2014, entitled "Pairing Computing Devices According to a Multi-Level Security Protocol," by Abhilasha Bhargav-Spantzel.
Intel Corporation, "Intel Identity Protection Technology," Feb. 3, 2015, 2 pages.

* cited by examiner

METHOD AND APPARATUS FOR SEAMLESS OUT-OF-BAND AUTHENTICATION

TECHNICAL FIELD

Embodiments relate to multi-factor authentication of a user.

BACKGROUND

There is increasing use of short message service (SMS) messages to verify user identity such as for enabling access to a given computing service. Typically, a service provider sends an SMS with a code to be received by a user device. The user then inputs this code as part of an authentication procedure, in which verification is performed with the service provider, which in turn enables access to the service if successful. However, there are drawbacks to this approach, including degrading of a user experience as well as possible security threats.

DETAILED DESCRIPTION

Figure 1:
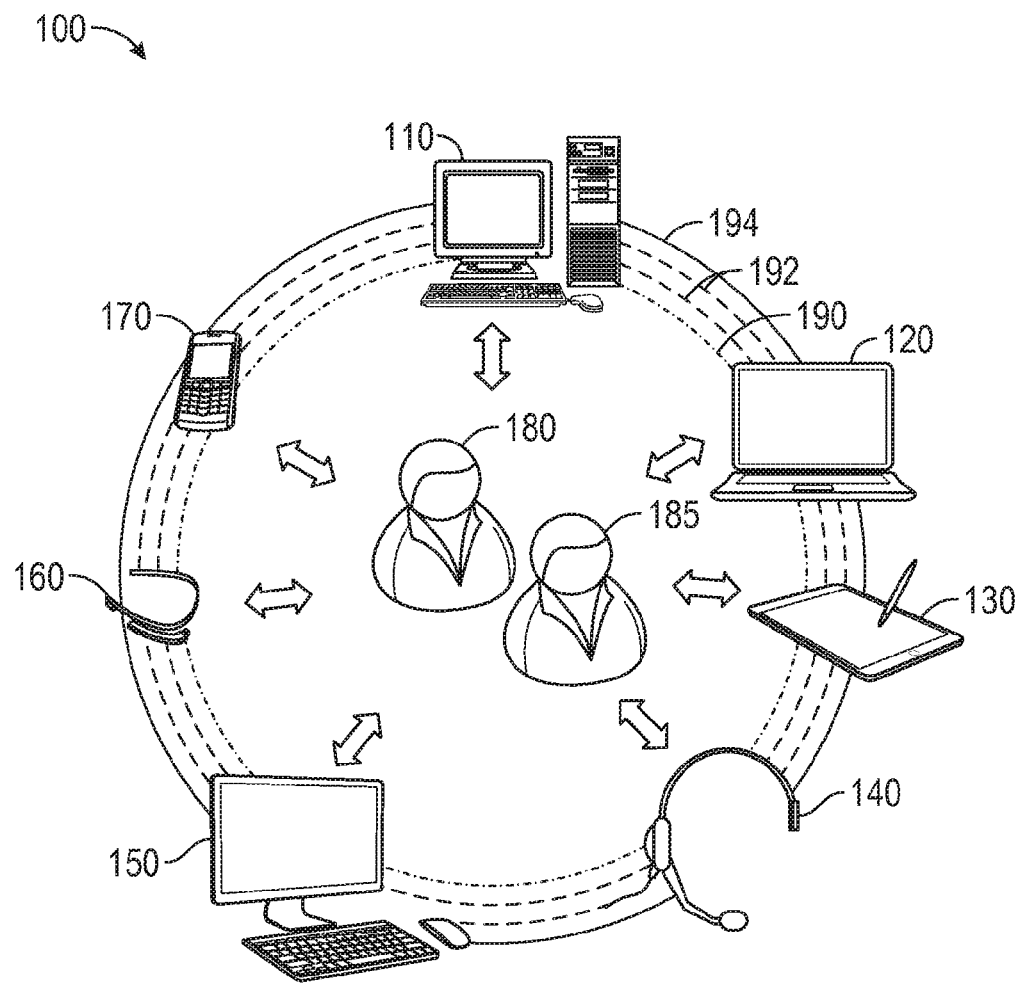
FIG. 1 is an illustration of pairing multiple devices in a user-centric multi-level security ring protocol in accordance with an embodiment of the present invention.

In various embodiments, a multi-factor authentication including one or more out-of-band (OOB) elements may be implemented in a manner that is seamless, that is, automated and transparent to a user (at least with regard to the OOB elements). In this way, embodiments provide for a better user experience and greater security, in addition to increased scale, simplicity and user convenience. As will be described herein, to increase security and robustness, one or more OOB verification elements of a multi-factor authentication (such as an automated PIN input and verification) may be performed using a trusted execution environment (TEE) of a processor of a system. This TEE may host a multi-factor authentication identity engine to perform at least portions of the authentication.

In embodiments, a SMS message (including a PIN or other one time password (OTP)) communicated to a mobile device of a user (e.g., by a backend) can be transferred to a TEE of another computing device of the user (e.g., a client system) to ensure an appropriate level of user identity and presence verification and ensure a secure end-to-end (E2E) channel. In one embodiment, a processor including Intel® Identity Protection Technology (including multi-factor authentication capabilities) available from Intel Corporation, Santa Clara, Calif., may be used to provide a secure connection with a wireless device in close proximity to the client system to automatically communicate an OTP securely from an authorized phone application to the platform TEE. Such connection and communication may be implemented seamlessly to the user and also ensure a desired level of security.

Embodiments may establish a cryptographically secure end-to-end channel between a mobile device and a client platform. This arrangement provides scale to multiple parallel uses of OOB verification for different usages. In an embodiment, a secure wireless connection may be used to push the OTP code from a mobile device to a selected security engine. This engine then sends the code to an originator of the OTP code, e.g., an independent software vendor (ISV) application. Responsive to receipt of this code, the ISV application can perform a remainder of the OOB authentication process. In this way, the burden and complexity is taken away from the user. Further by performing this authentication using components operating in a TEE, security is enhanced. Embodiments may be applied to any application that interfaces with the security engine for recovery, step-up authentication or other use cases using seamless OOB multi-factor authentication.

Example use cases for an OOB factor-involved authentication process include recovery, enrollment, and step up. In a recovery, as an example a user who typically logs into her domain using a PIN and a secure Bluetooth™ connection has forgotten her PIN. Note that the security afforded by such secure Bluetooth™ connection may be realized via an end-to-end (E2E) cryptographic secure channel from the TEE to a different computing device (e.g., having Bluetooth™ capability) associated with the user. At this point the user opts for a recovery that is based on another OOB factor of authentication, e.g., a SMS message that is sent to the different computing device associated with the user. In an enrollment, a similar flow occurs for a user's first time enrollment for an application, such as where a user's smartphone is mapped to the user identity. In a step-up MFA authentication, a policy may dictate that a user may perform an increased authentication procedure to access a sensitive enterprise site or to access other information.

In an embodiment, the user may initiate a request to access a service that requires the user to authenticate (e.g., an OS logon, a recovery service (such as for a password recovery), an enrollment service (such as to enroll in a particular service or account), or so forth).

Note that multiple computing devices associated with a user may be automatically and seamlessly paired, often in a manner transparent to the user. In some cases, the pairing of devices may be performed to enable devices to couple and interact with each other at an appropriate security privilege level, depending on authentication parameters and policy (e.g., involving user and/or device authentication). More specifically, in some embodiments a technique for a multi-level user-centric pairing of computing devices associated with one or more users may first occur before the seamless multi-factor authentication described herein. The multi-level aspect of this technique provides for multiple levels of security such that based on various authentication parameters and policy, two devices may couple to each other at a particular security level or ring to enable the devices to communicate and share information according to the given security level. Furthermore, the user-centered aspect of this technique bases the privilege level of pairing of the devices at least in part on an authentication of the user of the devices.

To this end, embodiments may use device type and a relationship that a user has with a device to transparently and securely pair the device with one or more other devices at an appropriate level of trust. Multi-level trust allows two platforms to pair with each other based on the level of sharing and interaction required between the devices. To effect the pairing and connectivity between devices, in various embodiments a wide range of device capabilities may be leveraged. For example, in some embodiments available wireless protocols such as a wireless local area network communication protocol, e.g., in accordance with an Institute for Electrical and Electronics Engineers 802.11 standard (e.g. a so-called Wi-Fi™ protocol) may be used. Still further, other wireless protocols such as a Bluetooth™ protocol or a near field communication (NFC) protocol similarly may be used.

In some embodiments a multiple security ring protocol may be used to support discovery and pairing within an appropriate ring (and thereafter connection and communication per the selected ring), prior to performing an OOB portion of a multi-factor authentication protocol. Although the scope of the present invention is not limited in this regard, in the implementation described herein for discussion purposes, a tri-ring model is presented in which devices may pair and connect via one of 3 different rings. However, understand that in other implementations more or fewer rings may be provided. To enable selection of an appropriate range of the multi-security ring protocol to be used to pair and connect devices, embodiments may use both device and user credentials. Depending on available information and the degree of trust afforded by a particular device and user credentials, pairing and connection between devices may be controlled to be at a given one of the multiple security rings. Using an embodiment of the present invention, a pairing protocol thus provides multiple security rings to enable pairing and connection between devices with the appropriate security, convenience and transparency.

Note that selection of an appropriate security ring level at which to pair devices may be based on a variety of factors, including user, device, and context information. In this way, pairing and connection between devices may be at different levels depending on any of this information. That is, pairing and connection between devices can vary and depend on a particular user persona that has been authenticated, a location at which one or more devices are located, and a particular environment in which one or more of the devices are operating. In contrast, available typical pairing protocols simply provide a single level of pairing and connection, regardless of any of the above criteria. Accordingly, embodiments provide programmable and controllable degrees of pairing with varying levels of permissiveness based on a given policy and the available user, device and context information and resulting authentications/attestations.

While the scope of the present invention is not limited in this regard, to enable sharing and connection, each of the devices may include a mechanism for performing user and device authentication. Still further, the devices may include a mechanism to perform a discovery protocol for peer devices, e.g., present in a wireless local area network with the device or remotely available (e.g. a local area network or wide area network, an Ethernet network, an Internet-based connection or so forth). In one particular embodiment, an Intel® Common Connectivity framework (CCF) may be used to perform discovery between devices. Using this CCF framework, devices can be discovered using conventional mechanisms (e.g., a Bluetooth™ or Wi-Fi™ protocol) followed by device and user authentication challenges.

After this initial discovery, embodiments provide a further layer of discovery over an established channel between the devices. This further discovery layer may include an automated negotiation of user identity information to pair devices at a selected one of the multiple privilege levels. More specifically, based on a policy associated with the pairing devices, and user, device, and context information, pairing and connectivity between the devices can be established at a given privilege level.

Embodiments provide a flexible and secure user-centric authentication and attestation. Stated another way, embodiments provide the ability to pair devices transparently (if possible) and securely using a TEE (e.g., an Intel® Software Guard Extensions (SGX)) and appropriate authentication mechanisms, such as Intel® Multi-Factor Authentication technologies. In addition, the device pairing described herein is user-centric, in that the devices determine whether they are currently under control of a common administrator/user (meaning that the same user and same user persona is authenticated to both devices). This is especially the case for biometric identifiers that may be used in user authentication to the various devices. As such, embodiments provide for user identity and control and TEE-based policy enforcement. Embodiments further provide a ring model for multi-level degrees of pairing. That is, once device ownership (based on user identity) and device trustworthiness (based on bi-directional attestation) have been performed, the level of connectivity between the devices may be determined and enforced by the TEE.

After discovery, the subsequent exchange of information may be protected over a channel specific to the level of access negotiated through pairing. In an embodiment, a secure channel endpoint can be protected using a trusted computing base (TCB) of the device according to a trusted execution environment of the target device. Note that this negotiation and pairing process may enable a better user experience, as in certain embodiments (at least for certain rings) transparent device pairing is based on passive user authentication and identity matching on each of the paired devices, which may be equivalent to a single sign on mechanism.

Referring to FIG. 1, shown is an illustration of pairing multiple devices in a user-centric multi-level security ring protocol in accordance with an embodiment of the present invention. Understand that such pairing may occur to initially securely pair devices before performing an OOB-included multi-factor authentication as described herein. As shown in FIG. 1, in an environment 100, which may be one or more locations, a plurality of devices 110-170 are present. As an example, environment 100 may be a work location such as a corporate facility that includes a variety of different computing devices that can be associated with users. In another case, environment 100 may represent multiple locations that a user may visit in the course of a day, including a home location, work location, and other location such as a public coffee shop or other public location that provides wireless access to people.

In the illustration of FIG. 1, disparate computing devices are present. Each of these devices may be a given type of computing device associated with one or more personas of one or more users. For purposes of example, assume that a single user has multiple user personas 180 and 185, with which one or more of the devices may be associated.

For purposes of illustration and not for limitation, the example devices shown in FIG. 1 include a first desktop computer system 110, which may be a user's own personal home-based personal computer, a laptop computer 120, which may be a work device assigned to the user, and a tablet computing device 130, which again may be a work device assigned to the user. Still further, FIG. 1 illustrates a wireless headset device 140, with which the user may seek to pair to one or more of the other computing devices. Understand further that in the context herein, headphone device 140 is a computing device, and may include various hardware, software and/or firmware to perform the user-centric multi-level security ring pairing described herein.

Still with reference to FIG. 1, another computing device 150 may be a user's work computer which may be coupled to an enterprise system, e.g., a corporate data center (not shown for ease of illustration in FIG. 1). Also present within the environment 100 is another portable computing device 160 such as an accessory device to access one or more of the other computing devices. Finally, a smartphone or other mobile device 170 is present, which may be a user's personal cell phone or a work-provided cell phone.

Understand that while shown with these example computing devices in the embodiment of FIG. 1, many other and different types of computing devices may take advantage of embodiments of the present invention. Furthermore, understand that to perform the pairing described herein according to one of multiple security rings, a given computing device may include certain hardware and software. At a minimum, the computing device may be configured to execute in a trusted execution environment using various hardware to perform user and device attestation and to perform discovery, negotiation, pairing and communication with paired devices as described herein.

FIG. 1 further illustrates the security ring concepts described herein in which given devices may couple via one of multiple security rings to provide for multi-level degrees of pairing between devices. In the embodiment of FIG. 1, a plurality of rings are present, including a first ring 190, which may be a private ring that affords a high level of security between paired devices and, as such based on a particular policy may enable sharing of a significant amount of the application and data information. A less privileged ring 192 is present, which may be formed of one or more different group rings that provide a group membership-based pairing between devices. In general, the level of security provided by a group ring is less than that of private ring 190. Still further, a third ring 194 may be implemented as a public ring, in which devices may be paired with relatively low levels of security such that although an attestation is performed, a user may remain anonymous. Understand that while shown with these limited security rings or levels, the scope the present invention is not limited to the illustrated and described rings and a greater number of security rings may be provided.

Via a public ring, an anonymous attestation may be performed to pair devices. In this way, the devices attest to a given level of trustworthiness, but there is no need for user trust assertions. As an example, secure discovery between devices to be paired via a public ring may be performed over a protected channel such as an Intel®-based enhanced privacy ID (EPID) protected channel. For example, a device attestation protocol may be performed to verify the state of the pairing devices, including an execution environment, type of available hardware, type of firmware available and so forth. In this way, even in the context of a public ring security level, pairing between devices is protected. However, according to this ring and a given policy, understand that the devices do not have unfettered access to each other. As differentiated from Bluetooth™ discovery and pairing which is unprotected, a pairing via a public ring according to an embodiment is protected but anonymous. Stated another way, even where devices are paired in the public ring, the devices are attested to trustworthiness of the device and user. Note in some embodiments, with even greater numbers of possible security rings, it can be a policy decision to determine whether pairing devices require attestation or not. For example, a fourth outer ring may allow any device to pair. However, due to the security risk of potentially malicious devices, the host may partition host resources into a sandbox environment that exposes only a subset of resources, which may have limited capabilities for such pairing.

Via a group ring (of which there may be one or more group rings based on additional context of the devices), a group membership-based pairing of devices may be implemented. This context can be based on identity record (e.g., group membership attributes) and/or platform sensor information. Although the scope the present invention is not limited in this regard, in representative embodiments groups may be of various types including family groups, neighborhood groups, work groups, social groups and so forth. Privacy information about the group is preserved and this pairing can leverage group-specific keys established during provisioning or group establishment. For a group ring protocol, a pairing device can verify that a requestor is a member in a public group without disclosing additional information of the user/requestor that could be aggregated by backend processes. Similarly, the pairing device can verify the requestor is a member of a sub-group without disclosing additional information that might be used for tracking.

Via a private ring, a single user as owner of multiple devices (and having presence verified) can securely pair the devices, leveraging user presence and strong authentication (e.g., a multi-factor authentication). Although different private ring protocols can be used, in an embodiment a beacon may be communicated (via a common Bluetooth™ connection or via a hub) with an Intel Protected Transaction Display™ technology that implements a trusted user input channel using a protected audio/video path (PAVP) technology to input a nonce or other security information, etc., to allow the pairing of the devices in a private ring, as an authenticated user presence is assured. In this way, the information can be displayed in a scrambled manner so that an observer in the operating system may not deduce the actual values selected (e.g., by a mouse or pointing device) even though the screen coordinates where the selection event took place is known to the attacker. Depending on the methodology used, the pairing can be passive and transparent to the user or may be active with active user participation. Note that in different implementations a broad spectrum of techniques may be used to perform the pairing.

Note that in any of the security rings described above, discovery and pairing protocols may preserve user privacy. That is, minimal disclosure regarding the user and device attributes occurs (where this disclosure may vary depending on level of ring). For example, membership in a group does not reveal personally identifiable information of the user to the pairing device or user as a condition of proving group membership. Paired devices share data selectively based on the level of trust. Embodiments thus provide enhanced system security using combinations of hardware, firmware and/or software, so malicious software on any device or a network-based attack can be prevented from impersonating as a legitimate device.

Figure 2:
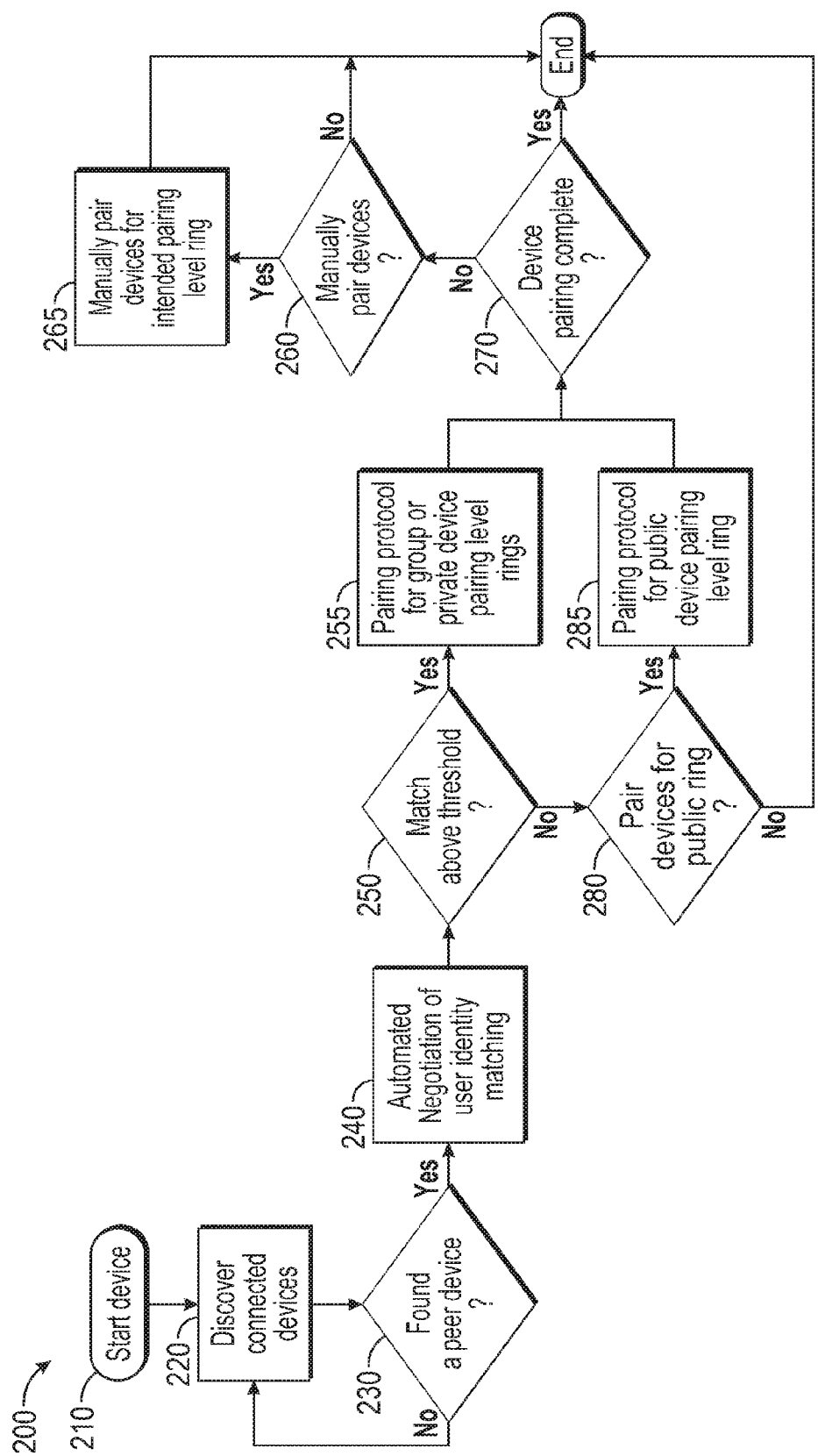
FIG. 2 is a flow diagram of a high level method for user-centric device pairing in accordance with an embodiment.

Referring now to FIG. 2, shown is a flow diagram of a high level method for user-centric device pairing in accordance with an embodiment. In general, method 200 may be performed using various hardware, software, and/or firmware of the devices to be paired, and may generally proceed through three high level steps. First, the method may automatically identify devices to be paired, e.g., based on user identity records. Next, a user-centric pairing of the devices (which may be passive or active) is performed. Thereafter, application and data sharing may occur based on a secure and privacy preserving ring model, which may include one or more seamless OOB factors as described herein.

With particular reference now to FIG. 2, method 200 begins at block 210 when a device is started. For example, a user may power on a device and it may trigger a user authentication, e.g., as determined by various policies of the device. Or in some cases, a user may have configured a device to enable power up and initialization without any type of authentication.

Next control passes to block 220 where connected devices may be discovered. In some embodiments, this discovery process may be performed using a conventional wireless discovery process such as by way of Bluetooth™ to determine presence of wireless-enabled devices in a proximity to the device. Of course additional discovery protocols may be performed to determine presence of other devices available either within a location at which the device is present or other network locations such as achievable according to a particular wired connection. In some embodiments, the discovery may proceed responsive to a user request. At diamond 230 as a result of this discovery process, it may be determined whether a peer device is found. If so, control passes to block 240 where an automated negotiation of user identity matching may be performed. More specifically here, a selected set of user attributes of the user of the device may be communicated with the peer device (and/or vice versa) to determine whether the users are identical or at least match above a particular threshold level. Thus at diamond 250 this determination as to whether a match is above a threshold level is made. If so, control passes to block 255.

At block 255 a given pairing protocol may be performed to attempt to pair the devices. In different embodiments, e.g., according to various policy information, the pairing protocol may be for a group ring or a private ring. Next control passes to diamond 260 to determine whether the devices are to be manually paired. When an automated pairing process is performed, and it is determined at diamond 270 whether the device pairing is complete and if so, method 200 may conclude, and the paired devices may communicate according to the particular sharing protocol for the selected security ring (and any other policy information associated with the devices subject to pairing). If instead at diamond 260 it is determined that the devices are to be manually paired, e.g., according to a given policy or user request, control passes to block 265 where the devices may be manually paired at the appropriate privilege level.

Still referring to FIG. 2, if back at block 250 it is determined that the user identity matching is not above a given threshold, control passes to diamond 280 to determine whether it is desired or permitted to allow the devices to pair according to a public ring level. This determination may be based on user input, e.g., according to a prompt to the user or based on policy information. Control passes to block 285 where a pairing protocol for a public level ring is performed. Control passes to next to diamond 270 discussed above. Understand while discussed at this high level in the embodiment of FIG. 2, many variations and alternatives are possible.

Figure 3:
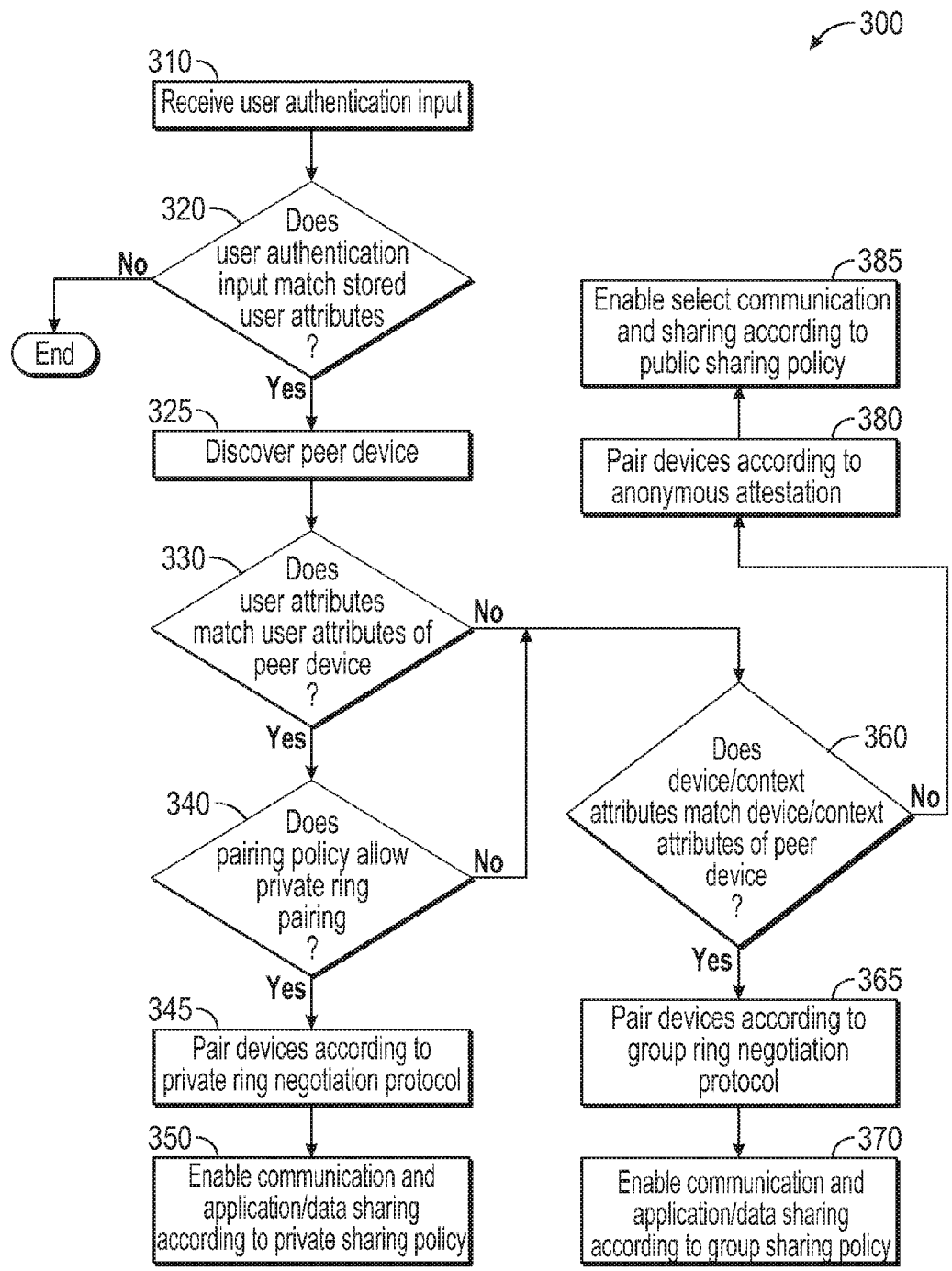
FIG. 3 is a flow diagram of a method in accordance with another embodiment of the present invention.

Referring now to FIG. 3, shown is a flow diagram of a method in accordance with another embodiment of the present invention. More specifically, method 300 of FIG. 3 may be performed by similar pairing logic of a device to determine based on user attributes information and policy information an appropriate level of security ring at which to allow devices to be paired, and thereafter by sharing logic to enable communications to occur according to the established security level.

As seen, method 300 begins by receiving a user authentication input (block 310). Various types of user input are possible. In the embodiment here, a multi-factor authentication may be performed, e.g., including voice information, image information, other presence information, user password, biometric information among other types of user authentication. Next, control passes to diamond 320 to determine whether the user authentication input matches stored user attributes. In a system in which policy requires at least some form of user authentication validity, if there is no match determined at diamond 320 at least to a threshold level, method 300 may conclude, and no pairing may be possible. As an example, a user identity record may store various authentication attributes, e.g., including a voice template, a fingerprint scan, an eye scan or so forth, and such information may be used to determine whether a match occurs, at least to a threshold level.

If the user is authenticated, control passes to block 325 where the device may perform a discovery protocol to determine whether one or more peer devices are present in a proximity to the device. On discovery of a peer device, control passes to diamond 330 to determine whether the user attributes of the current device match user attributes of the peer device (at least to a threshold level) (diamond 330). If so, control passes to diamond 340 to determine whether, e.g., according to the level of attribute match (such as based on the likelihood of user identity, the types of user attributes considered, or so forth) a private ring pairing is allowed. If so, control passes to block 345 where the devices may be paired according to a private ring negotiation protocol. In some implementations the private ring negotiation protocol may be an Automated Trust Negotiation (ATN), while in other embodiments some amount of user involvement may be implicated.

Thus at this point the devices are paired according to a private ring security level. Accordingly, the devices may communicate with each other in this private ring security level, which in some embodiments may include a further OOB factor of authentication. Thus at block 350, communications of application/data information may be performed to share such information according to a private sharing policy. In some embodiments, a single private sharing policy may be available and shared by the devices, while in other cases the different devices may have different private sharing policies, and thus an additional negotiation (not shown for ease of illustration in FIG. 3) may be performed to determine an appropriate level of application/data sharing for the paired devices.

If instead at diamonds 330 or 340, determinations are in the negative, control passes to diamond 360 to determine whether device/context attributes indicate a match with corresponding attributes of the peer device. If so, control passes to block 365 where the devices may be paired according to a group ring negotiation protocol. In some implementations the group ring negotiation protocol may be an ATN and/or may include some amount of user involvement may be implicated.

Thus at this point the devices are paired according to a group ring security level. Accordingly, the devices may communicate with each other in this group ring security level. Thus at block 370, communications of application/data information may be performed to share such information according to a group sharing policy. This sharing may be of lesser secure information than in the case of a private ring sharing policy. In some embodiments, a single group sharing policy may be available and shared by the devices, while in other cases the different devices may have different group sharing policies, and thus an additional negotiation (not shown for ease of illustration in FIG. 3) may be performed.

Otherwise, if there is no match of these device/context attributes as determined at diamond 360, control instead passes to block 380 where the devices may be paired (optionally) according to an anonymous attestation protocol. After such pairing of the devices, communication and sharing may be enabled and may occur (block 385). Note that such sharing may be according to a given public sharing protocol, which again may be common amongst the devices or may be a result of a further negotiation. In any event, the likely scenario is that communication sharing is performed according to a public security ring is less than that of either a group or private security ring. Understand while shown with this particular illustration in FIG. 3, many variations and alternatives are possible.

Figure 4:
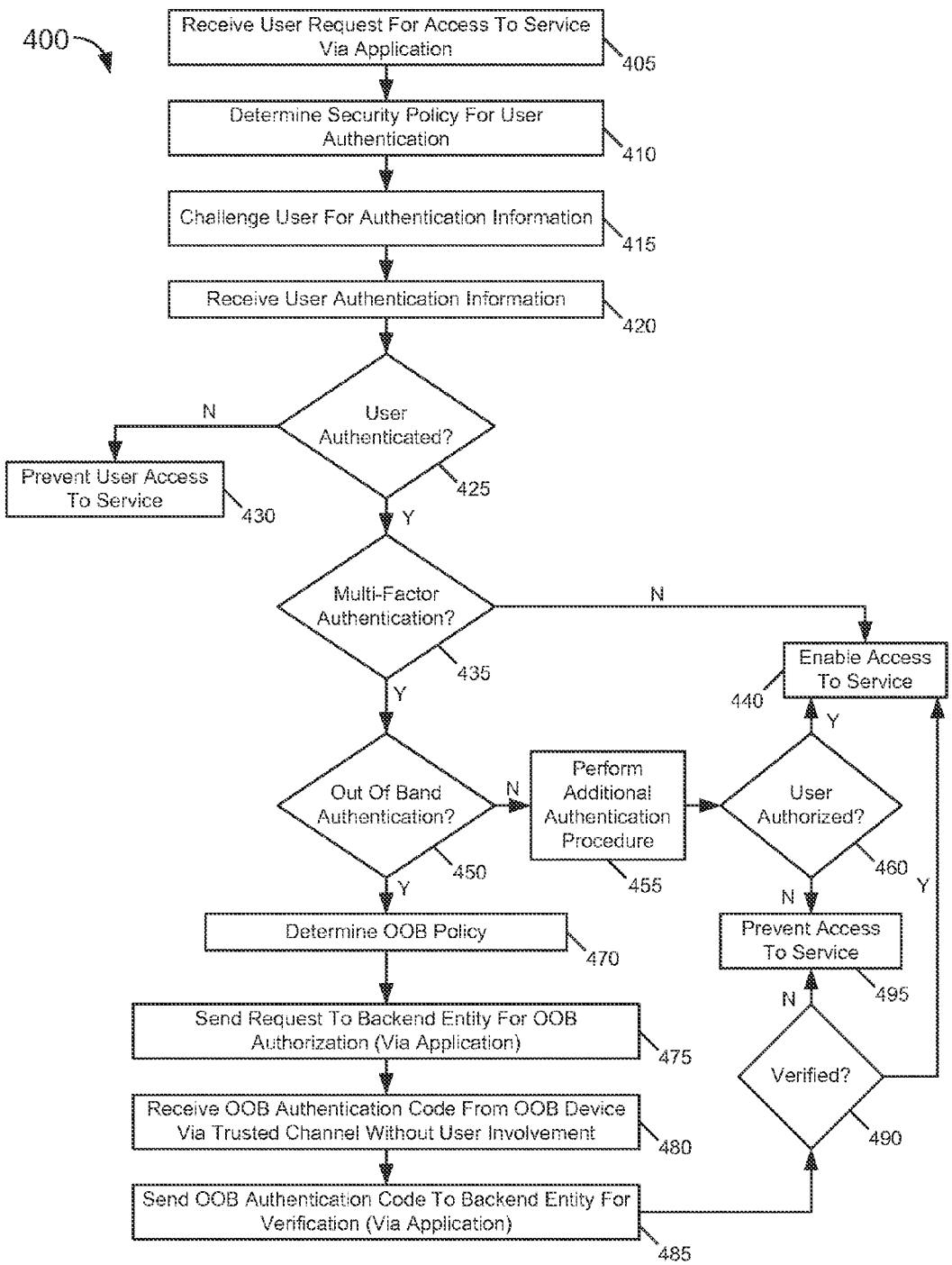
FIG. 4 is a flow diagram of a method for performing an OOB-based seamless authentication in accordance with an embodiment of the present invention.

Referring now to FIG. 4, shown is a flow diagram of a method for performing an OOB-based seamless authentication in accordance with an embodiment of the present invention. As shown in FIG. 4, method 400 may be performed by a combination of hardware, software, and/or firmware of a device. In the embodiment shown in FIG. 4, the operations described are with respect to a client computing system, such as a client desktop computer. For purposes of discussion, assume that a user of this client system desires to access a service available via a remote system, such as a backend server of a service provider with which the user has a relationship.

Still further, this OOB authentication also involves an additional computing device of the user, such as an available mobile device, e.g., smartphone, tablet computer or so forth, configured to perform a trusted pairing with the client system prior to the user's seeking access to the service. Note that in many instances association of this mobile device with the user may be indicated in a user profile of the service. For purposes of method 400 shown in FIG. 4, assume that the user's two devices, namely the client system and the mobile device, have already performed an authentication (e.g., seamlessly) with each other such that the mobile device is securely paired with the client system before the beginning of method 400.

With reference to FIG. 4, method 400 begins at block 405 by receiving a user request for access to a service. Assume for purposes of context and example that the request for access is for a user to access a secure financial account of the user, e.g., a bank account, stock account, credit card account or other financial account that the user has with a third party (e.g., bank, other financial institution or so forth). As discussed, this request may be received via an application such as a user application installed on or otherwise available to the user's client system, e.g., via access to a website application of the third party.

Next at block 410 a security policy may be determined for this user authentication (block 410). In an embodiment, this security policy may be stored in a policy storage associated with the third party and accessible via a request from the client system. This security policy may indicate a level of authentication that the user is to proceed through before being allowed the requested access. Various details regarding the security policy, such as the types of user authentication information to be received, number of factors for authentication, and so forth may be included. Next, at block 415 the user is challenged for authentication information. As an initial authentication, the user may provide a username and password, which may be received by one or more user input devices (block 420). Next it can be determined whether the user is authenticated based on this initial user authentication information (diamond 425). If not, control passes to block 430 where the user is prevented further access to the service. For example, an Internet connection to the website may be terminated, a report generated regarding a potential security violation, or so forth.

Still referring to FIG. 4, assuming that the user is authenticated according to this initial authentication information, control passes next to diamond 435 to determine whether a multi-factor authentication is dictated according to the security policy. If not, such as in instances where relatively minimal sensitive information is available via the service, the user is thus authenticated and control passes to block 440 where the user is enabled to access the service, with partial or full access to a requested website and/or account associated with the user.

Still with reference to FIG. 4, if instead it is determined that a multi-factor authentication is dictated by the security policy, control passes next to diamond 450 to determine whether this multi-factor authentication includes an OOB authentication. If not, control passes to block 455 where one or more additional authentication procedures may be performed. As one example, assume that the multi-factor authentication according to the security policy includes, in addition to username and password, at least one biometric input, such as a thumb print, retinal eye scan or so forth. In this case, the user provides such biometric authentication information, e.g., via a biometric device. Next it is determined at diamond 460 whether the user is authenticated (such as where the biometric authentication information matches a stored record for the user (e.g., at least within a threshold tolerance)). If so, the user is allowed access to the service (block 440). Otherwise, the user is prevented access to the service (block 495).

Still with reference to FIG. 4, instead if it is determined at diamond 450 that an out-of-band authentication is desired, control passes to block 470 where the OOB policy may be determined. In an embodiment, this OOB policy may be provided as part of the security policy so that logic of the client system can seek to obtain appropriate OOB authentication information for furthering the OOB multi-factor authentication process. Assume that the OOB arrangement is to seamlessly provide an OOB authentication code (e.g., a PIN or other number or code) from the backend to the user's mobile device and thereafter seamlessly from the mobile device to the client system.

This process begins at block 475, where a request is sent to a backend entity for an OOB authorization. In an embodiment, this request may be sent via the application. Next at block 480 the client system receives an OOB authentication code from the associated mobile device (referred to herein as an OOB device, as this device and communications between the client system and this device are separate from and thus out-of-band to communications between the client system and the backend entity).

In an embodiment, this OOB authentication code, which was originally communicated from the backend entity to the mobile device, may be received via a trusted channel and without user involvement. That is, assume that the backend entity sends a SMS message to the mobile device. Thereafter, the mobile device may automatically and seamlessly to the user provide the SMS message to the client system via a prior previously paired secure channel in a manner transparent to the user (although understand that in some cases receipt of the SMS message in the mobile device and its subsequent transmission to the client system may be visible to a user).

Still with reference to FIG. 4, after the client system receives this OOB authentication code, it may communicate the same to the backend entity to enable the backend entity to verify that the OOB authentication code matches that originally sent from the backend entity to the mobile device (block 485). Still further, this confirmation acts as a verification that the user (or at least the user's previously paired mobile device) is in close proximity to the client system. As such, assuming that this received OOB authentication code matches that originally sent by the backend entity, at diamond 490 the user is verified. Thus control passes to block 440 where the user is enabled to access the service. Otherwise such access is prevented (block 495). Although shown at this high level in the embodiment of FIG. 4, understand that many variations and alternatives are possible.

Figure 5:
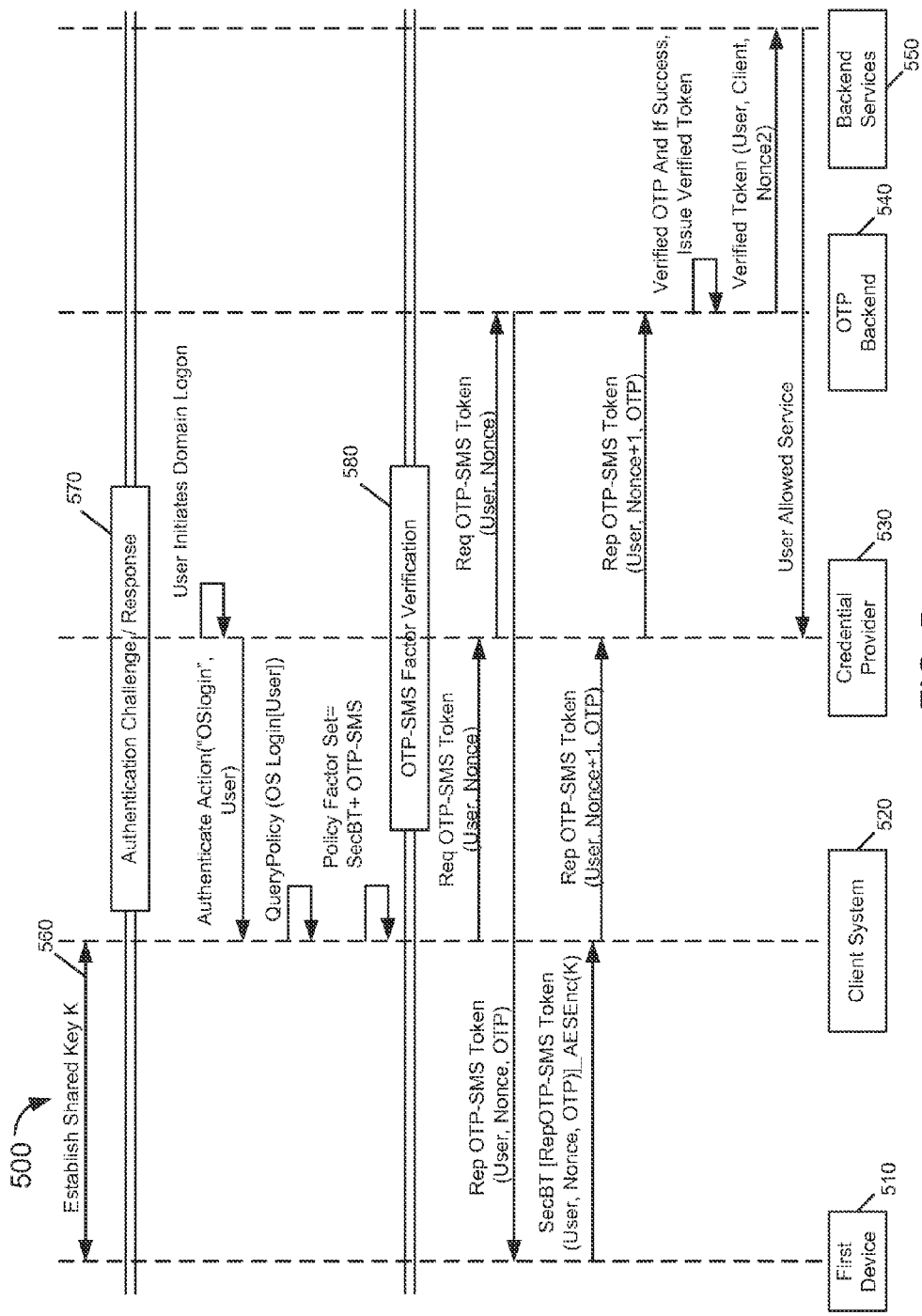
FIG. 5 is an illustration of an OOB multi-factor authentication protocol in accordance with an embodiment of the present invention.

Referring now to FIG. 5, shown is an illustration of an OOB multi-factor authentication protocol in accordance with an embodiment of the present invention. As shown in FIG. 5, protocol 500 may take place between a variety of different computing devices in disparate locations. A first device 510 may be a mobile device such as a smartphone or tablet computer of a user. In addition, a client system 520 may be a laptop or desktop system associated with the user (e.g., a work or home computer). In the embodiment shown, a credential provider 530 may execute on client system 520, and may be implemented within an OS of the system. Devices 510 and 520 communicate with backend systems, including a first backend system 540, which may be used for OOB operations, and a second backend system 550, which may be used to provide backend services, responsive to authentication according to a given OOB multi-factor protocol.

As illustrated, protocol 500 begins by establishing a shared connection between first device 510 and client system 520. In an embodiment, these devices may enter into a seamless pairing relationship when first device 510 is in close proximity to client system 520. Although the scope of the present invention is not limited in this regard, in one example embodiment first device 510 may pair with client system 520 via a wireless local area network and/or wireless personal area network protocol such as a Bluetooth™ connection. After a successful pairing, these devices may establish a shared key K, which in an embodiment may be stored on both devices.

Assume that at a later time, the user of client system 520 desires to access a backend service at backend system 550. In an embodiment, responsive to receipt of a user access request, an underlying application may delegate authentication responsibility to a given security agent. To initiate such access using an OOB multi-factor authentication protocol, an initial authentication challenge and response process 570 may be performed. Although the scope of the present invention is not limited in this regard, this process may occur using credential provider 530 such as where the user initiates a domain logon and seeks to authenticate to the system (e.g., using a familiar username and password protocol). Here however note that credential provider 530 determines an appropriate security policy for the requested access to the backend service, which as shown includes an OOB multi-factor authentication (including a secure Bluetooth™ and OOB process implemented using a SMS arrangement). In this example, the policy indicates that there is to be a secure Bluetooth connection with an authorized device and authentication is to proceed using an OOB one time password sent via an SMS on the authorized phone. Note that a signed policy can also be stored on the local system, verified and read by the TEE.

Thus as further seen in FIG. 5, thereafter an OTP-SMS factor verification protocol 580 of the multi-factor authentication occurs. To this end, client system 520 issues a request for a token. As seen, this request for an OTP-SMS token may be sent including certain user information (such as a user ID and a nonce). In turn, credential provider 530 issues this request to OTP backend system 540. In turn, OTP system 540, after verifying this request, sends the OTP-SMS token to a mobile device associated with the user (namely the first device 510).

In the embodiment shown, this token includes the user identifier and nonce, and an OTP identifier, which in an embodiment may be a generated OTP such as an alphanumeric code randomly (or pseudo-randomly) generated. Next, first device 510 may process the token by encrypting it with previously generated shared key K. Thereafter, first device 510 issues, via a secure channel (e.g., a secure Bluetooth™ channel), this OTP-SMS token in an encrypted format (e.g., according to a given Advanced Encryption Standard (AES) encryption protocol). As seen, this token includes user identifier, nonce, and OTP identifier.

If this verification is successful, system 540 issues a verified token (including the user identifier, client information (namely an identifier for client system 520) and another nonce to backend system 550, which in turn may inform credential provider 530 that access to the requested service is allowed. Understand while shown at this high level in FIG. 5, many variations and alternatives are possible.

Figure 6:
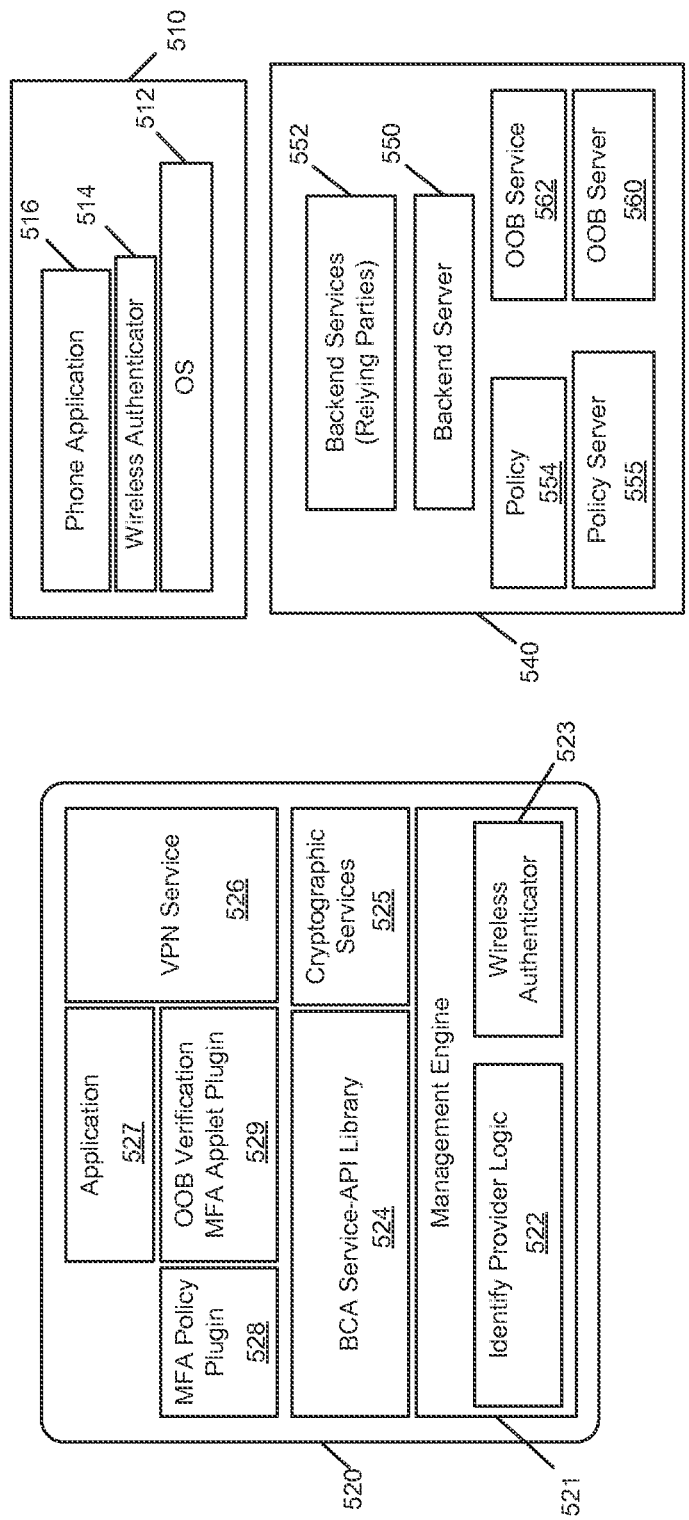
FIG. 6 is a block diagram of a multi-system arrangement in accordance with an embodiment of the present invention.

Referring now to FIG. 6, shown is a block diagram of a multi-system arrangement in accordance with an embodiment of the present invention. As shown in FIG. 6, the arrangement may include multiple computing devices 510, 520, and a collection of systems 540 (also referred to as backend 540). For purposes of the OOB multi-factor authentication described herein, assume that system 510, which is a given mobile device, is in a wireless personal area network in close proximity to system 520, which is a given client computer system. In turn, these devices may couple, e.g., via a variety of interconnections with backend 540 that includes a backend server 550, a policy server 555, and an OOB server 560.

Client system 520 may include a variety different hardware, including one or more processors such as one or more multicore processors, memory such as a system memory (e.g., dynamic random access memory (DRAM)), mass storage such as a disk drive or solid state drive, and a network connection, among other such hardware. For purposes of performing a OOB multi-factor authentication, this network interface may include one or more different wireless interfaces such as a Wi-Fi™ interface and a Bluetooth™ interface. In some cases at least some of the hardware may be shared for these different wireless interfaces. In addition, a wired interface such as an Ethernet interface also may be present to provide for Internet-based connection with backend 540.

In the illustration of FIG. 6, client system 520 is shown to include a management engine 521 (equally referred to herein as a manageability engine). In various embodiments, management engine 521 may be a collection of hardware and associated firmware and/or software to perform security operations on behalf of a given processor. In many instances, management engine 521 may be implemented within a processor package, e.g., as a separate die within the package or on a single die with the cores and other logic of the processor. In the embodiment shown, management engine 521 includes an identity provider logic 522. In various embodiments, identity provider logic 522 may be configured to perform authentication operations, including the OOB multi-factor authentication described herein. Management engine 521 further includes a wireless authenticator 523, which may be configured to perform authentication operations for wireless connections. Thus wireless authenticator 523 may, upon authentication of an associated device wireless device (such as a smartphone of a common user in a wireless personal area network), establish a trusted wireless channel between the two devices.

As further illustrated in FIG. 6, system 520 further includes a hierarchical software architecture including an application programming interface (API) library 524. In an embodiment, API library 524 includes various a variety of services, including biometric client authentication (BCA) services, which may be used to authenticate a particular user to client system 521 and ensure, e.g., according to a periodic interval, that once authenticated, the user remains in close proximity to the system (at least when a given sensitive application is being executed). To this end, API library 524 may interface with one or more presence detectors of system 520. In addition, a set of cryptographic services 525 are provided. In various embodiments, such services may be used to perform cryptographic operations including encryption and decryption, e.g., using a public key infrastructure (PKI) arrangement.

The architecture present in client system 520 further includes a virtual private network (VPN) service 526 to enable one or more VPN connections to be established with remote servers. An OOB verification multi-factor authentication plug-in 529 may provide an interface between an application 527 and other software and hardware within system 520. More specifically, plug-in 529 may enable the operations described herein to perform an OOB multi-factor authentication when dictated by application 527. Such authentication may be dictated according to an MFA policy plug-in 528, which interfaces with a policy server 555 of backend 540 to determine an appropriate policy for authentication of a user for a particular application (e.g., application 527).

With further reference to FIG. 6, mobile device 510 includes a software architecture that has an OS 512. In different embodiments, OS 512 may be an ANDROID™-based OS or, an iOS™-based OS available from Apple Corporation, or another mobile OS. A wireless authenticator 514 executes on top of OS 512, and may perform a secure wireless pairing with client device 520 as described herein. As further shown, a phone application 516 also executes on OS 512. In various embodiments, phone application 516 may be configured to receive an OOB-SMS token from backend 540, process the same and provide the processed token seamlessly via a trusted wireless channel to client device 520 for the OOB multi-factor authentication described herein. More specifically, thus the OTP is automatically and seamlessly sent to MFA applet 529 using the secure Bluetooth™ channel. Note that the OTP may be encrypted using symmetric pre-shared key K. After decrypting the incoming message, client system 520 updates the nonce and forwards the OTP-SMS token to credential provider 530, which in turn sends this token back to OTP backend system 540 for verification. In turn, MFA applet 529 returns the code via the ISV to the OOB service 562, which verifies the code and sends a success/failure to engine 521 and/or the relevant relying party.

Still referring to FIG. 6, backend 540 may include a plurality of different servers, e.g., co-located within a datacenter or distributed as different servers of one or more entities. As seen, the servers include backend server 550 on which backend services 552 may execute. Such services may include one or more services desired to be accessed by a user via application 527. Before allowing such access, services 552 may rely on the OOB multi-factor authentication performed according to a policy 554 set in a policy server 555 and using an OOB service 562 that executes on OOB server 560. Understand while shown at this high level in the embodiment of FIG. 6, many variations and alternatives are possible.

In a situation in which a seamless pairing is performed (e.g., according to a given pairing policy), no user input is needed and the pairing protocol automatically pairs the devices based on the state of user authentication, user context and, in some cases, the connectivity ring to which the devices are to be paired. For example, for a public ring connection, user input may not be needed as the device can gather sufficient user information and context based on TEE attestation and user presence. Asymmetric keys (e.g., Rivest Shamir Adelman (RSA) key pairs) can be shared between the paired devices, and secure communication can occur using a transport layer security (TLS)-based (or similar, e.g., Intel® Sigma protocol or Diffie-Hellman key exchange) protocol (e.g., using a shared symmetric key). Other examples include an EPID implemented using ECC asymmetric cryptography/keys.

In a situation in which an active pairing is performed (e.g., according to a given pairing policy), a variety of user input may be received and used in the pairing process. In one methodology, user input based pairing is as follows:
1. Device 1 creates public and private keys <RSA_Device1$_{pub}$, RSA_Device1$_{priv}$>.
2. Device 2 creates public and private keys <RSA_Device2$_{pub}$, RSA_Device2$_{priv}$>.
3. Device 2 generates a PIN using a trusted output channel (e.g., via a trusted communication path between security processor and output device (e.g., display)) such that malware in the system cannot ascertain the PIN.
4. User reads PIN and inputs it in Device 1.
5. Device 1 then communicates its public key as follows: Device 1 sends to Device 2: [RSA_Device2$_{pub}$,nonce]$_{H(PIN)}$.
6. Device 2 knows the PIN since it had generated it. Device 2 decrypts the last message and communicates its public key in the following manner: Device 2 sends to Device 1: [RSA_Device1$_{pub}$,nonce+1].

At the end of this process, the public keys of the two devices that are being paired are set. Thereafter the devices can create shared session keys to be used to establish and maintain a secure channel for the given ring level. Note that pairing instantiated using RSA asymmetric keys is one example solution. ECC may be another and Diffie-Hellman a third (where DH produces symmetric pairing keys).

Figure 7:
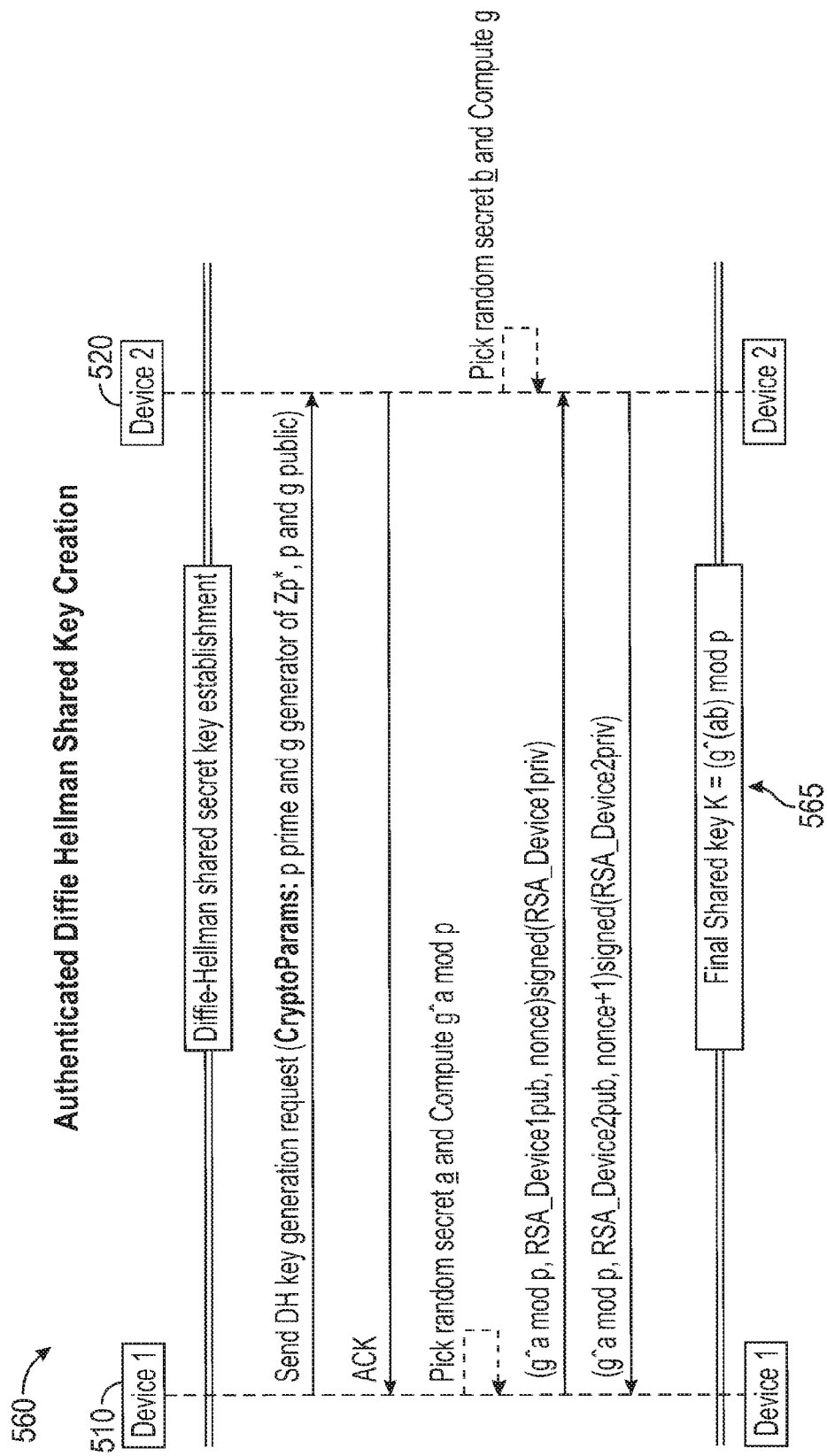
FIG. 7 is an illustration of a shared key creation protocol in accordance with an embodiment.

Different embodiments of shared key establishment may be used. In one example a Diffie Hellman protocol may be used to generate a shared key, such that forward secrecy is ensured and known key attacks prevented. Referring now to FIG. 7, shown is an illustration of a shared key creation protocol in accordance with an embodiment. As seen in FIG. 7, first device 510 and second device 520 perform a shared key creation process 560 in accordance with the Diffie Hellman protocol. To this end, a shared secret key is established via a negotiation in which requests, acknowledgment and communication of signed blobs are sent between the devices to result in a final shared key 565 that may be used to encrypt communications between the devices.

In another embodiment, a shared key can be updated during use for data communications. For example, a generated shared key can be updated based on incremented counters such that communication between paired devices for a given session is based on incrementing the symmetric key after each exchange according to the following:

Device 1->Device 2: $E_{K+counter}$(random,timestamp, RSA_Device2$_{pub}$).

Device 2->Device 1: $E_{K+counter}$(random',timestamp', RSA_Device1$_{pub}$).

Such key update protocol prevents replay and ensures secure device-to-device communication. Note that in some embodiments key revocation and renewal may have similar options for the user based on system-based initiation of pairing state renewal.

Once the pairing is established, the devices can communicate securely with each other to perform application and data sharing based on the secure and privacy preserving ring model. In some cases, such as to access a secure service (e.g., available via a remote backend), a further seamless OOB authentication factor may be performed.

Figure 8:
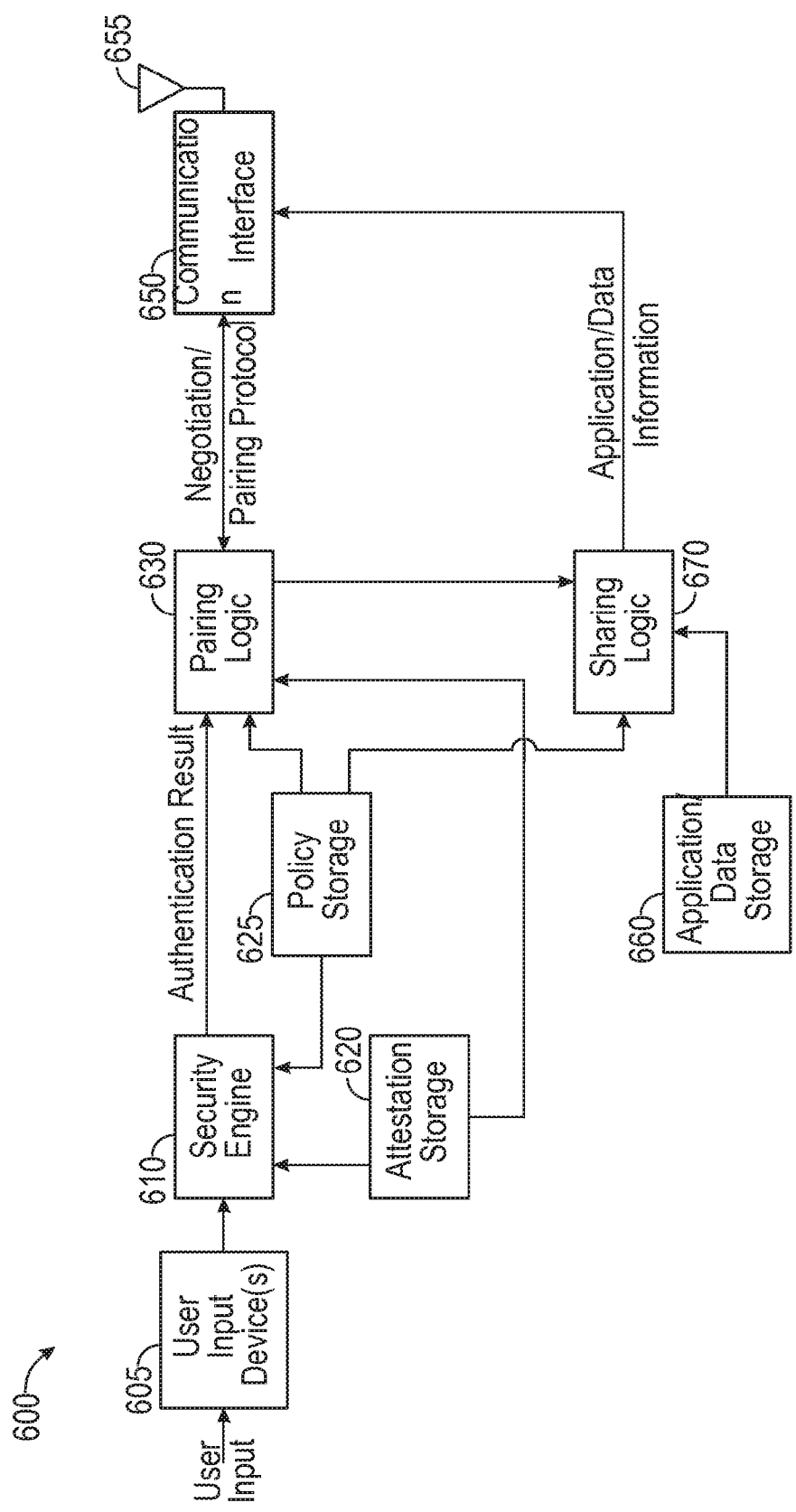
FIG. 8 is a block diagram of a portion of a system in accordance with an embodiment of the present invention.

Referring now to FIG. 8, shown is a block diagram of a portion of a system in accordance with an embodiment of the present invention. As shown in FIG. 8, system 600, which may be any type of computing device, includes one or more user input device to receive user input. Types of user input devices vary in different examples and can include familiar keyboard, virtual keyboard, mouse, touchpad, touchscreen, and so forth, in addition to authentication-based devices such as a fingerprint scanner, eye scanner, among others. In turn, user input information from such user input devices are provided to a security engine 610 which in different implementations may be a standalone security processor or a secure cryptoprocessor e.g., included within a general-purpose processor such as a multicore processor or other SoC.

Based on user input information and information in an attestation storage 620 (such as a corresponding identity record to which the user input information is compared for a relative or probabilistic match), security engine 610 may generate an authentication result, e.g., to indicate whether a given user is authenticated according to a given authentication process (such as a seamless multi-factor authentication as described herein), as dictated by a policy stored in a policy storage 625.

Still with reference to FIG. 8, a pairing logic 630 receives a result of this authentication, and may perform a pairing protocol, e.g., with a discovered device, which may be discovered via wireless communications through a communication interface 650, which in an embodiment may be a wireless interface coupled to an antenna 655. The determination as to whether to pair two devices at a given security ring level may be based on information received from the other device and information in a pairing policy stored in policy storage 625. Assuming that the devices are permitted to pair according to a given security ring level, pairing logic 630 interfaces with sharing logic 670 which, based on a sharing policy stored in policy storage 625, may determine whether and to what extent application and/or data information stored in a storage 660 may be shared with the paired device.

Understand further that various logic of system 600 also may be used to perform a seamless OOB factor of a multi-factor authentication protocol. To this end, assuming that the user is initially authenticated as above, security engine 610, pairing logic 630, and communication interface 650 may be configured to initiate a request for an OOB token, to be received via communication interface 650 from a secure channel established with another user device, such as an authenticated user smartphone. After appropriate processing of this OOB token, the same logic may communicate the processed token to a backend initiator of the OOB token to thus complete an OOB factor of a multi-factor authentication, leading to a valid user authentication and thus access to a secure service available via the backend. Understand while shown at this high level and with a limited number of components in the embodiment of FIG. 8, the scope of the present invention is not limited in this regard.

Figure 9:
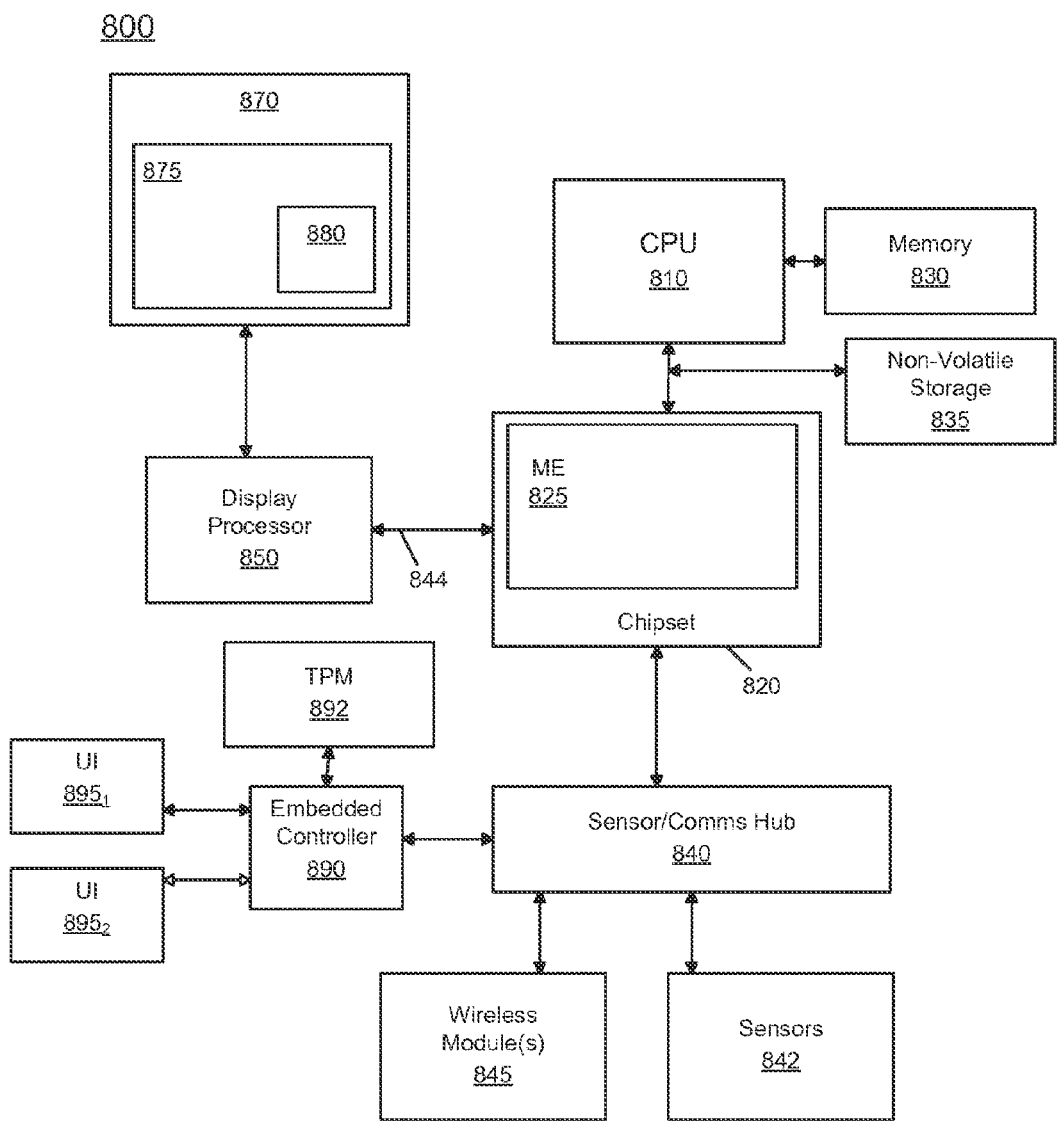
FIG. 9 is a block diagram of a system arrangement in accordance with an embodiment of the present invention.

Referring now to FIG. 9, shown is a block diagram of a system arrangement in accordance with an embodiment of the present invention. As seen in FIG. 9, system 800 may be a user platform such as a personal computer, tablet, phablet (or other form factor) and includes a CPU 810. In various embodiments, this CPU may be a SoC or other multicore processor and can include secure execution technologies to set up a trusted execution environment to be used as described herein. In different embodiments, the TEE may be implemented using Intel® SGX technology, Intel® TXT technology, or an ARM TrustZone. To this end, implementations may include various hardware, both general-purpose and specialized security hardware, to create a TEE and perform secure pairing, communication operations, and seamless OOB-included multi-factor authentications in such environments.

As seen in the embodiment of FIG. 9, CPU 810 may be coupled to a chipset 820. Although shown as separate components in the embodiment of FIG. 9, understand that in some implementations chipset 820 may be implemented within the same package as CPU 810, particularly when the CPU is implemented as an SoC. Chipset 820 may include a manageability engine 825 which in an embodiment may be used to perform at least portions of the user-centric multi-level pairing and connection protocols described herein. As further seen, various portions of a memory system couple to CPU 810, including a system memory 830 (e.g., formed of dynamic random access memory (DRAM)) and a non-volatile storage 835, at least portions of which may be a secure storage to store user identity records, device attestation information, and/or policy information as described herein.

In the embodiment of FIG. 9, additional components may be present including a sensor/communications hub 840 which may be a standalone hub or configured within chipset 820. As seen, one or more sensors 842 may be in communication with hub 840. For purposes of user authentication and device/context attestation, such sensors can include biometric input sensors, one or more capture devices, and a global positioning system (GPS) module or other dedicated location sensor. Other sensors such as inertial and environmental sensors also may be present. As several examples, an accelerometer and a force detector may be provided and information obtained from these sensors can be used in biometric authentications. Also, in various embodiments one or more wireless communication modules 845 may be present to enable communication with local or wide area wireless networks such as a given cellular system in accordance with a 3G or 4G/LTE communication protocol.

As further seen in FIG. 9, platform 800 may further include a display processor 850 that can be coupled to chipset 820 via channel 844, which may be a trusted channel, in some embodiments. As seen, display processor 850 may couple to a display 870 that can be a touch screen display to receive user input such as responses to authentication requests. Thus in this example, configured within the display may be a touch screen 875 and a touch screen controller 880 (which of course is hidden behind the display itself). Other user interfaces, namely user interfaces $895_1$ and $895_2$ which in an example can be a keyboard and a mouse, may be coupled via an embedded controller 890 to sensor/communications hub 830. Also, in the embodiment of FIG. 9, a hardware TPM 892 further couples to embedded controller 890, and may be used to perform at least portions of a pairing and/or connection protocol using secrets such as various keys.

Figure 10:
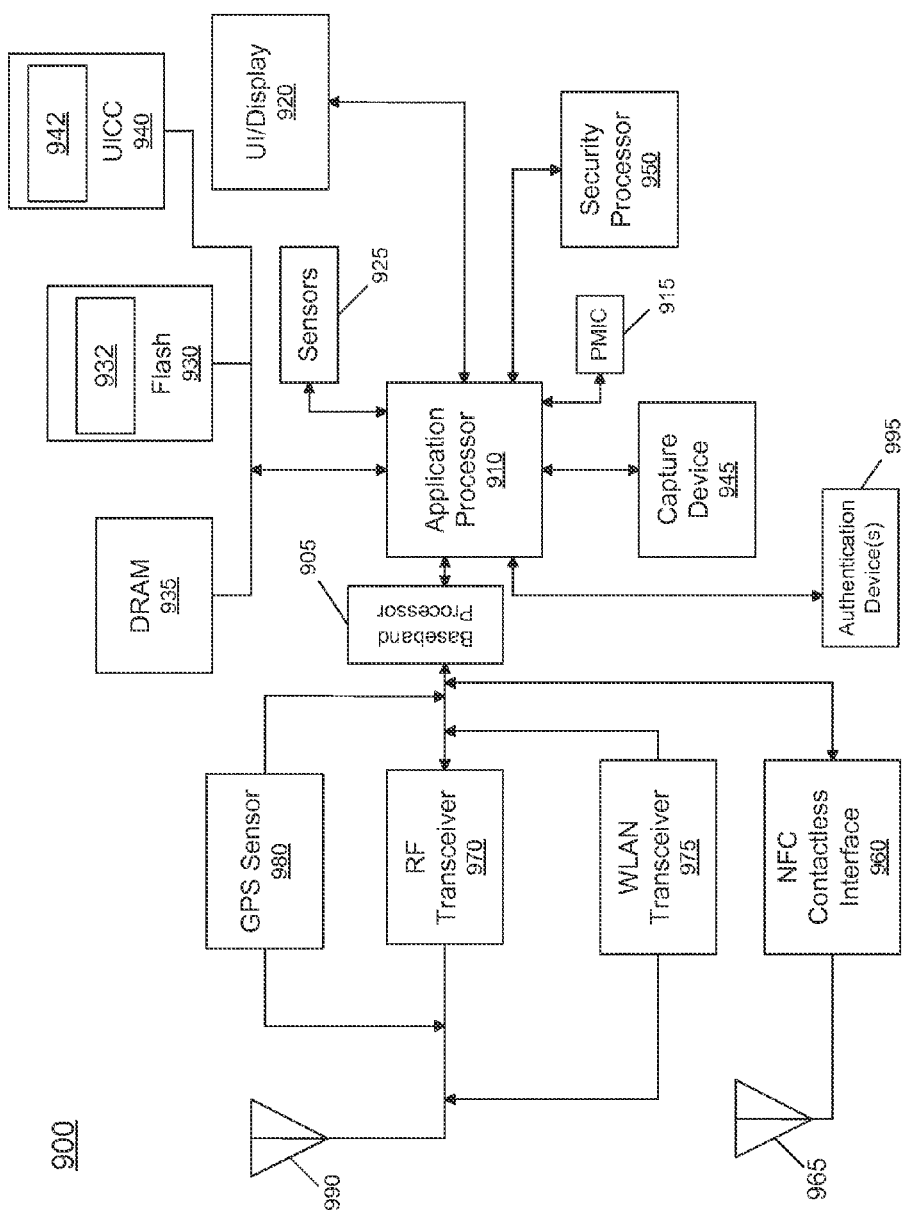
FIG. 10 is a block diagram of another example system with which embodiments can be used.

Referring now to FIG. 10, shown is a block diagram of another example system with which embodiments can be used. As seen, system 900 may be a smartphone or other wireless communicator. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device. Application processor 910 may execute one or more phone and/or SMS applications to receive remotely sent OOB messages and seamlessly provide the same to a paired local client system.

Application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which user identity records, attestation information, and security policies (including OOB-included multi-factor authentications, pairing and sharing policies as described herein) may be stored. As further seen, application processor 910 also couples to a capture device 945 such as one or more image capture devices that can record video and/or still images.

Still referring to FIG. 10, a universal integrated circuit card (UICC) 940 comprising a subscriber identity module, which in some embodiments includes a secure storage 942 to store secure user information. System 900 may further include a security processor 950 that may couple to application processor 910. In various embodiments, at least portions of the user-centric OOB-included multi-factor authentication, multi-level pairing and sharing techniques may be performed using security processor 950, which may be used in part to set up a TEE. A plurality of sensors 925 may couple to application processor 910 to enable input of a variety of sensed information such as accelerometer and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 10, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 11:
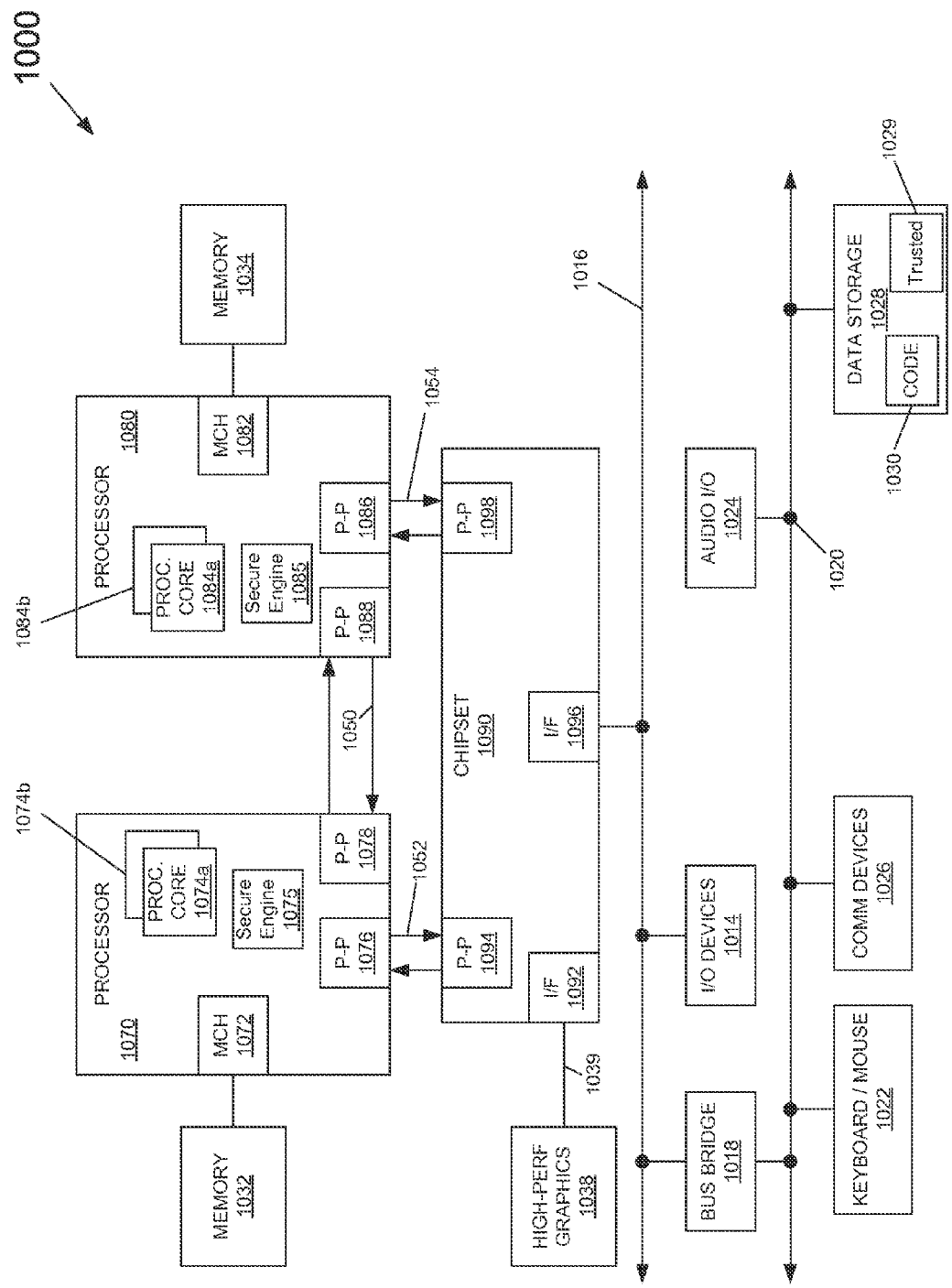
FIG. 11 is a block diagram of a system in accordance with another embodiment of the present invention.

Referring now to FIG. 11, shown is a block diagram of a system in accordance with another embodiment of the present invention. As shown in FIG. 11, multiprocessor system 1000 is a point-to-point interconnect system, and includes a first processor 1070 and a second processor 1080 coupled via a point-to-point interconnect 1050. As shown in FIG. 11, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to create a TEE and to perform at least portions of the OOB-included multi-factor authentication, trusted pairing and sharing operations described herein.

Still referring to FIG. 11, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 10, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 10, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 11, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device which may include code 1030, in one embodiment. As further seen, data storage unit 1028 also includes a trusted storage 1029 to store user and device attestation information and policy information, as described herein. Further, an audio I/O 1024 may be coupled to second bus 1020.

Via the seamless OOB authentication techniques described herein using a secure channel and a TEE, embodiments can verify a user without the need for the user to be actively involved in the process, and still ensuring a high level of user authentication and presence detection.

Embodiments thus provide a root of trust emanating from a hardware MFA identity engine to create a secure channel between a client system and another system such as a smartphone or peripheral device. In turn, this device receives an OOB authentication token to be automatically and transparently transmitted to the TEE to complete the authentication. Note that in some cases, the user devices may be initially paired according to a multi-level security protocol. As such, TEE components may be used for secure retrieval of an OOB token from a paired device. In turn, the TEE interacts with a backend authentication service for a seamless OOB verification without active user involvement to access secure services.

Embodiments thus provide a more secure platform for both enterprise and consumers that provide for an OOB factor verification. Embodiments further provide an excellent user authentication experience, as the user does not have to carry out any action for an OOB verification. At the same time, security is not compromised as user presence is continuously detected based on policy-based factors. In addition, a user has more flexibility to multi-task or carry out multiple OOB factor verifications without having to track a given OOB authentication sequence.

The following Examples pertain to further embodiments.

In Example 1, a method comprises: requesting, by an authentication logic of a system during a multi-factor authentication of a user of the system to obtain access to a first service, a token to be sent from a second system associated with the first service to a third system associated with the user, the third system coupled to the first system via a wireless personal area network; receiving, in the authentication logic, the token from the third system without user involvement via a secure channel of the wireless personal area network, where the token is received in the third system from the second system responsive to the request; and sending the token from the authentication logic to the second system to authenticate the user.

In Example 2, the method further comprises accessing the first service, responsive to the user authentication.

In Example 3, the method further comprises: receiving, in the authentication logic from the third system, an encrypted token including the token having an authentication value and a nonce, the nonce included in the request from the system to the second system; and decrypting the encrypted token using a shared key, the shared key pre-shared between the system and the third system and stored in a non-volatile storage of the system.

In Example 4, the method of Example 3 further comprises updating the nonce and sending an updated token from the authentication logic to the second system, the updated token including the authentication value and the updated nonce.

In Example 5, the multi-factor authentication comprises an OOB multi-factor authentication, and the method of Example 4 further comprises determining that the user is present in a proximity to the system before the updated token is sent to the second system.

In Example 6, the method of one or more of the above Examples further comprises: responsive to receipt of a user request to access the first service, accessing a policy associated with the first service stored in a policy storage to determine the multi-factor authentication, and requesting the token based on the policy, where the token comprises a short message service message including an authentication code.

In Example 7, in the method of one or more of the above Examples, the third system comprises a mobile device, the system comprises a client computer system, and the wireless personal area network comprises a Bluetooth™ network.

In Example 8, in the method of one or more of the above Examples, the multi-factor authentication is to enable at least one of: recovery of an authentication code of the user; enrollment of the user to the first service; and step-up authentication of the user to enable the user to access secure information.

In Example 9, a machine-readable storage medium includes machine-readable instructions, when executed, to implement a method of any of the above Examples.

In Example 10, a machine-readable storage medium includes instructions, when executed, to implement a method of one or more of the above Examples.

In Example 11, a processor comprises: at least one core to execute instructions; and a manageability engine coupled to the at least one core to perform security operations, the manageability engine including: a multi-factor authentication logic to cause a request for an OOB authentication to be sent from a system including the processor to a backend system associated with an application to which a user seeks access; and a wireless authentication logic to create a secure channel between the system and a mobile device in proximity to the system, the mobile device comprising an authorized device of the user, and to receive via the secure channel an OOB authentication value from the mobile device seamlessly to the user, the mobile device to receive the OOB authentication value from the backend system responsive to the OOB authentication request.

In Example 12, the multi-factor authentication logic of Example 11 is to cause the OOB authentication request to be sent responsive to a policy associated with the application accessed from a policy storage, where the policy identifies an OOB-short message service authentication factor.

In Example 14, the processor of one or more of the above Examples further comprises a cryptographic logic to receive an encrypted message from the mobile device including the OOB authentication value and to decrypt the encrypted message to obtain the OOB authentication value.

In Example 15, the multi-factor authentication logic of one or more of the above Examples is to cause the mobile device to be securely paired with the system and to create at least one shared key.

In Example 16, the multi-factor authentication logic of Example 15, is to: receive from the mobile device an encrypted token including the OOB authentication value and a nonce, the nonce included in the OOB authentication request; and decrypt the encrypted token using the at least one shared key.

In Example 17, the multi-factor authentication logic of Example 16 is to update the nonce and send an updated token to the backend system, the updated token including the OOB authentication value and the updated nonce.

In Example 18, a system comprises: a security processor to operate in a trusted execution environment to perform security operations and to authenticate a user of the system according to a multi-factor authentication; at least one user input device coupled to the security processor to receive user input for a first factor of the multi-factor authentication and to enable the user input to be provided to the security processor; and a wireless interface coupled to the security processor, where the security processor is to create a trusted channel between the wireless interface and a mobile device in a wireless personal area network with the system, and to thereafter receive an OOB token from the mobile device via the trusted channel for a second factor of the multi-factor authentication, and send the OOB token to a remote server seamlessly to the user.

In Example 19, the security processor of Example 18 is to initiate a request for the OOB token to be sent to the remote server to cause the mobile device to receive the OOB token from the remote server, where the security processor is to receive the OOB token from the mobile device via the trusted channel transparently to the user.

In Example 20, the security processor of one or more of the above Examples is to execute in a trusted execution environment and to request the OOB token from the remote server while in the trusted execution environment.

In Example 21, the OOB token of one of the above Examples comprises a short message service message to be received in the mobile device but not to be displayed to the user.

In Example 22, the security processor of one or more of the above Examples is to receive the OOB token in an encrypted format and to decrypt the encrypted format to send the OOB token to the remote server.

In Example 23, the security processor of one or more of the above Examples is to initiate the multi-factor authentication responsive to a user request for one of a recovery of an authentication code of the user, enrollment of the user to a service accessible via the remote server, and step-up authentication of the user to enable the user to access secure information.

In Example 24, a first system for authenticating a user comprises: means for requesting, during a multi-factor authentication of a user of the first system to obtain access to a first service, a token to be sent from a second system associated with the first service to a third system associated with the user, the third system coupled to the first system via a wireless personal area network; means for receiving the token from the third system without user involvement via a secure channel of the wireless personal area network, where the token is received in the third system from the second system responsive to the request; and means for sending the token to the second system to authenticate the user.

In Example 25, the first system of Example 24 further comprises means for accessing the first service, responsive to the user authentication.

In Example 26, the first system of one or more of the above Examples further comprises: means for receiving from the third system an encrypted token including the token having an authentication value and a nonce, the nonce included in the request from the system to the second system; and means for decrypting the encrypted token using a shared key, the shared key pre-shared between the system and the third system and stored in a non-volatile storage of the system.

In Example 27, the first system of Example 26 further comprises means for updating the nonce and sending an updated token to the second system, the updated token including the authentication value and the updated nonce.

Understand also that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium comprising instructions that when executed enable a system to:
request, by an authentication logic of the system during a multi-factor authentication of a user of the system to obtain access to a first service, a token to be sent from a second system associated with the first service to a third system associated with the user, the third system coupled to the first system via a wireless personal area network, the request including a nonce;
receive, in the authentication logic, an encrypted token from the third system without user involvement via a secure channel of the wireless personal area network, wherein the encrypted token is received in the third system from the second system responsive to the request, the encrypted token including the token having an authentication value and the nonce;
decrypt the encrypted token using a shared key, the shared key pre-shared between the system and the third system and stored in a non-volatile storage of the system; and
update the nonce and send an updated token from the authentication logic to the second system to authenticate the user, the updated token including the authentication value and the updated nonce.

2. The at least one non-transitory computer readable medium of claim 1, further comprising instructions that when executed enable the system to access the first service, responsive to the authentication of the user by the second system.

3. The at least one non-transitory computer readable medium of claim 1, wherein the multi-factor authentication comprises an out-of-band (OOB) multi-factor authentication, and further comprising instructions that when executed enable the system to determine that the user is present in a proximity to the system before the updated token is sent to the second system.

4. The at least one non-transitory computer readable medium of claim 1, further comprising instructions that when executed enable the system to:
responsive to receipt of a user request by the user of the system to access the first service, access a policy associated with the first service stored in a policy storage to determine the multi-factor authentication, and request the token based on the policy, wherein the token comprises a short message service message including an authentication code.

5. The at least one non-transitory computer readable medium of claim 1, wherein the third system comprises a mobile device, the system comprises a client computer system, and the wireless personal area network comprises a Bluetooth™ network.

6. The at least one non-transitory computer readable medium of claim 1, wherein the multi-factor authentication is to enable at least one of:
recovery of an authentication code of the user;
enrollment of the user to the first service; and
step-up authentication of the user to enable the user to access secure information.

7. A processor comprising:
at least one core to execute instructions; and
a manageability engine coupled to the at least one core to perform security operations, the manageability engine including:
a multi-factor authentication logic to cause a request for an out-of-band (OOB) authentication to be sent from a system including the processor to a backend system associated with an application to which a user seeks access;
a wireless authentication logic to create a secure channel between the system and a mobile device in proximity to the system, the mobile device comprising an authorized device of the user, and to receive via the secure channel an OOB authentication value from the mobile device seamlessly to the user, the mobile device to receive the OOB authentication value from the backend system responsive to the OOB authentication request, wherein the multi-factor authentication logic is to:
cause the mobile device to be securely paired with the system and to create at least one shared key;
receive from the mobile device an encrypted token including the OOB authentication value and a nonce, the nonce included in the OOB authentication request;
decrypt the encrypted token using the at least one shared key; and
update the nonce and send an updated token to the backend system, the updated token including the OOB authentication value and the updated nonce.

8. The processor of claim 7, wherein the multi-factor authentication logic is to cause the OOB authentication request to be sent responsive to a policy associated with the application accessed from a policy storage, wherein the policy identifies an OOB-short message service authentication factor.

9. The processor of claim 7, wherein the processor further comprises a cryptographic logic to receive an encrypted message from the mobile device including the OOB authentication value and to decrypt the encrypted message to obtain the OOB authentication value.

* * * * *